US006244412B1

(12) United States Patent
Schmitz

(10) Patent No.: US 6,244,412 B1
(45) Date of Patent: Jun. 12, 2001

(54) AUTOMATIC CLUTCH TORQUE CONTROL FOR A MECHANICAL PRESS

(75) Inventor: Dave Schmitz, Coldwater, OH (US)

(73) Assignee: The Minster Machine Company, Minster, OH (US)

( * ) Notice: Subject to any disclaimer, the term of this patent is extended or adjusted under 35 U.S.C. 154(b) by 0 days.

(21) Appl. No.: 09/363,111

(22) Filed: Jul. 29, 1999

(51) Int. Cl.[7] .................................................. F16D 43/284
(52) U.S. Cl. .................................................. 192/103 F
(58) Field of Search .......................... 192/103 F; 100/282

(56) References Cited

U.S. PATENT DOCUMENTS

| | | | |
|---|---|---|---|
| 3,752,284 | 8/1973 | Brittain et al. . | |
| 3,803,835 * | 4/1974 | Rodov | 60/6 |
| 4,019,614 | 4/1977 | Prenzel et al. . | |
| 4,253,414 * | 3/1981 | Schafer | 192/103 F X |
| 4,331,226 | 5/1982 | Heidemeyer et al. . | |
| 4,674,609 * | 6/1987 | Sturges et al. | 192/103 F X |
| 4,805,750 * | 2/1989 | Nitz | 192/103 F X |
| 4,850,215 * | 7/1989 | Landwehr et al. | 100/289 X |
| 5,014,832 | 5/1991 | Satoh et al. . | |
| 5,125,332 * | 6/1992 | Beck et al. | 100/282 X |
| 5,194,053 | 3/1993 | Sano et al. . | |
| 5,405,293 | 4/1995 | Severinsson . | |
| 5,522,713 * | 6/1996 | Lian | 425/116 |
| 5,549,185 | 8/1996 | Kale . | |
| 5,564,333 * | 10/1996 | Palmer | 100/282 |
| 5,806,640 | 9/1998 | Kale . | |
| 6,101,932 * | 8/2000 | Wilkens | 100/41 |

* cited by examiner

*Primary Examiner*—Rodney H. Bonck
(74) *Attorney, Agent, or Firm*—Randall J. Knuth

(57) ABSTRACT

An apparatus and method for automatically controlling the clutch torque of a mechanical press is utilized to lessen the impact of a die wreck condition. Press machine operation is continually monitored including slippage of the engaged clutch relative to the flywheel. The clutch is initially engaged at full engagement pressure. Clutch engagement pressure is then reduced until clutch slippage occurs. At the point at which clutch slippage occurs, clutch engagement pressure is increased until clutch slippage is eliminated. Clutch slippage continues to be monitored and if clutch slippage occurs again, a press fault is indicated. Since the operating tonnage of the mechanical press is kept to a minimum, press damage due to a die wreck is minimized.

30 Claims, 2 Drawing Sheets

AUTOMATIC CLUTCH TORQUE CONTROL FOR A MECHANICAL PRESS

BACKGROUND OF THE INVENTION

1. Field of the Invention

The present invention relates to a method and apparatus for monitoring the necessary energy and/or tonnage for a particular application of a mechanical press and for adjusting clutch torque to achieve this necessary energy and/or tonnage. Adjusting clutch torque to achieve the minimum necessary operating tonnage lessens possible press damage caused by a die wreck.

2. Description of the Related Art

Mechanical presses of the type performing stamping and drawing operations employ a conventional construction which includes a frame structure having a crown and a bed and which supports a slide in a manner enabling reciprocating movement toward and away from the bed. The slide is driven by a crankshaft. A connecting rod is operatively connected to the crankshaft and slide. The connecting rod is operative to transmit the rotational energy of the crankshaft into reciprocal movement of the slide. These press machines are widely used for a variety of workpiece operations and employ a large selection of die sets with the press machine varying considerably in size and available tonnage depending upon its intended use.

Conventional press machines employ a tooling apparatus in the form of a die assembly to shape a workpiece, such as in a stamping or drawing operation. The die assembly particularly includes a lower die attached to the bed or bolster and an upper die or punch attached to the slide. The upper and lower dies are installed in opposing spaced-apart relation to one another and cooperate during press machine operation to mutually engage the workpiece at respective sides thereof to thereby effect the desired forming activity.

Press operational problems occur when foreign material enters the die set. Large pieces of foreign material entering the die set can cause a die wreck in which the die set of the mechanical press can be significantly damaged. Additionally, contacting large pieces of foreign material or debris during press operation will create excessive vibration throughout the press.

Many mechanical presses employ a hydraulic overload protection device which serves to alleviate problems associated with foreign objects entering the die set. Such hydraulic overload protection devices are of limited utility as they commonly provide protection only with respect to foreign objects small in height. Larger foreign objects would exceed the capacity of the overload protection device and cause die or press damage.

What is needed in the art is a method and apparatus for preventing or lessening the effect of die destruction and associated problems which can occur when large foreign objects enter the die set.

SUMMARY OF THE INVENTION

The present invention provides a method and apparatus for determining the necessary or lowest operating tonnage for a mechanical press and for adjusting clutch torque to achieve such necessary operating tonnage. In this way, any foreign object entering the die set will receive only the minimum operating tonnage of the mechanical press and as the foreign object forces the press to exceed this necessary tonnage, the clutch of the mechanical press will slip, thus limiting the tonnage transferred to the foreign object and thus limit the associated damage caused thereby.

The present invention provides a clutch slip monitoring device in the form of measuring devices which measure the angular displacement of both the flywheel and the clutch. These angular displacements can then be compared to determine whether the clutch is slipping relative to the flywheel. Such a clutch slip monitoring device is communicatively connected to a clutch pressure adjusting device and signals changes in applied clutch pressure depending upon measured clutch slippage. In this way, the pressure of engagement between the clutch and the flywheel (or, more generally drive and driven members) may be regulated so that clutch slip is eliminated and the necessary tonnage for the particular application is achieved. With such a device in place, the mechanical press will be without an excess surplus of applied operating tonnage.

The invention, in one form thereof, comprises an apparatus for automatically controlling the clutch torque of a mechanical press. The apparatus of this form of the current invention includes a clutch slippage monitor and a clutch pressure adjuster which is communicatively connected to the clutch slippage monitor.

The invention, in another form thereof, comprises a mechanical press having an automatic clutch torque control. The press of this form of the current invention includes a flywheel, a clutch, a clutch slip monitoring device, and a clutch pressure adjusting device. The clutch is operative to selectively engage the flywheel and has an adjustable clutch engagement pressure. The clutch slip monitoring device is operable to monitor clutch slippage and is operatively connected to the clutch. The clutch pressure adjusting device is operative to vary the clutch engagement pressure and is communicatively connected to the clutch slip monitoring device and operatively connected to the clutch.

In one form of the current invention, the clutch slip monitoring device includes a first measuring device for monitoring the angular displacement of the flywheel. A second measuring device is provided and monitors the angular displacement of the clutch. A high speed counter module is communicatively connected to both the first measuring device and the second measuring device. The high speed counter module is operative to evaluate the angular displacement of the flywheel and the angular displacement of the clutch to determine the extent of clutch slippage relative to the flywheel. The first and second measuring devices can be, for example, a first pulse generator and a second pulse generator respectively. The first pulse generator is affixed to the flywheel while the second pulse generator is connected to the clutch. The second pulse generator may be affixed to the crankshaft of the mechanical press, which is operatively connected to the clutch. In one form of the current invention, both the first pulse generator and the second pulse generator are resolvers.

An output module is communicatively connected to the high speed counter module and to the pressure adjusting device. The pressure adjusting device is operatively connected to the clutch and is operative to control the adjustable clutch engagement pressure. The output module is communicatively connected to the pressure adjusting device so that the output module is operative to control the adjustable clutch engagement pressure based upon clutch slippage as determined by the high speed counter module. In one form of the current invention, the output module is operative to produce a zero to ten VDC signal operative to vary the clutch engagement pressure provided by the pressure adjusting device.

In one form of the current invention, the pressure adjusting device includes a proportional pressure relief valve which is communicatively connected to the output module. The pressure adjusting device further includes a pressure reducing valve which is operative to control the adjustable clutch engagement pressure. The proportional pressure relief valve is operatively connected to the pressure reducing valve and is operative to communicate a pilot pressure to the pressure reducing valve whereby the pilot pressure controls the adjustable clutch engagement pressure. Pressure is provided to the pressure reducing valve by way of a pressurizing pump.

The invention, in another form thereof, comprises a method of operating a mechanical press at the necessary tonnage for the particular application of the mechanical press. The method of this form of the current invention includes the steps of: monitoring the required operating tonnage for the press application and adjusting the press operating tonnage in real time to achieve the required operating tonnage.

The invention, in another form thereof, comprises a method of automatically controlling the clutch torque of a mechanical press to achieve the necessary operating tonnage for a press application. The method of this form of the current invention includes the steps of: monitoring clutch slippage during press operation and adjusting the clutch torque to achieve the necessary operating tonnage and eliminate clutch slip.

In one form of the current invention, the step of monitoring clutch slippage during press operation includes the steps of: monitoring the angular displacement of the drive member (e.g. a flywheel), monitoring the angular displacement of a driven member (e.g. a clutch), and evaluating the angular displacement of the drive member and the angular displacement of the driven member to determine the extent of relative slippage therebetween.

In one form of the current invention the step of monitoring the angular displacement of the flywheel includes the steps of: affixing a pulse generator to the flywheel and monitoring the pulses from said pulse generator. In one form of the current invention, the step of: monitoring the angular displacement of the clutch similarly includes the steps of connecting a pulse generator to the clutch and monitoring the pulses from the pulse generator. The step of connecting a pulse generator to the clutch may be accomplished by affixing a pulse generator to the crankshaft.

In one form of the current invention, the step of evaluating the angular displacement of the flywheel and the angular displacement of the clutch to determine the extent of clutch slippage includes the steps of: providing a high speed counter module, communicating the pulses from the flywheel pulse generator to the high speed counter module, communicating the pulses from the clutch pulse generator to the counter module, producing an up count in the counter module for every pulse from the flywheel pulse generator, producing a down count in the counter module for every pulse from the clutch pulse generator, and determining the count total for each press stroke.

In one form of the current invention, the step of adjusting clutch torque to achieve the necessary operating tonnage and eliminate clutch slip includes the steps of: placing the clutch in full pressure engagement with the flywheel, determining whether the count total is within a predefined acceptable range, decreasing the clutch engagement pressure a predefined increment if the count total is within the predefined acceptable range, repeating the two previous steps until the count total is no longer within the predefined acceptable range, increasing the clutch engagement pressure a predefined increment, and maintaining a constant clutch engagement pressure. In one form of the current invention, this method further includes the step of: halting the press if the count total is no longer within the predefined acceptable range. Additionally, a press stop condition may be signaled if the count total is no longer within the predefined acceptable range.

An advantage of the present invention is the ability to effectively operate a mechanical press without producing surplus tonnage.

Another advantage of the present invention is the ability to decrease the force applied to a foreign object which enters the die set of the press and therefore to lessen the consequences thereof.

A further advantage of the present invention is the ability to monitor slip between the clutch and the flywheel so as to provide constant tonnage monitoring in a mechanical press which could be effectively utilized as an indicator of tooling or clutch wear, or any other press maintenance concern which would necessitate additional applied force from the mechanical press.

Another advantage of the present invention is the ability to minimize press down time and maintenance due to a tooling or die wreck.

Yet another advantage of the present invention is the ability to reduce the pressure going to the clutch plates down to an absolute minimum required pressure so that the torque transmitted from the flywheel is reduced to a minimum and the potential damage to the press in the event of a die wreck is effectively minimized.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
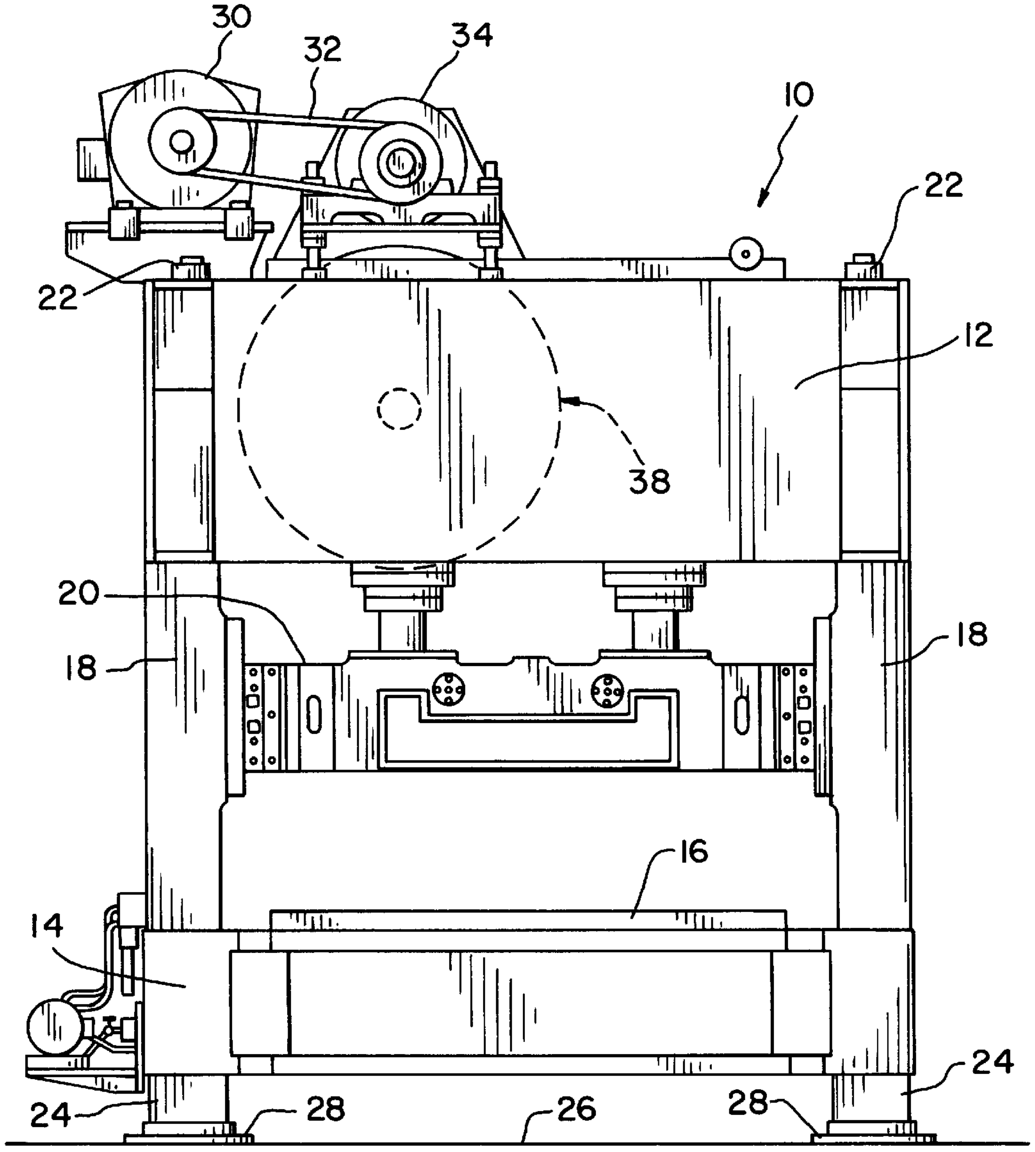
FIG. 1 is a front elevational view of a mechanical press incorporating one form of the current invention.

Referring now to the drawings and particularly to FIG. 1, mechanical press 10 includes crown 12 and bed 14 having a bolster assembly 16 connected thereto. Uprights 18 connect crown 12 with bed 14. Uprights 18 are connected to or integral with the underside of crown 12 and the upper side of bed 14. Slide 20 is positioned between uprights 18 for reciprocating movement. Tie rods (not shown) extend through crown 12, uprights 18 and bed 14 and are attached at each end with tie rod nuts 22. Leg members 24 are formed as an extension of bed 14 and are generally mounted on shop floor 26 by means of shock absorbing pads 28. Press drive motor 30 is attached by means of belt 32 to auxiliary flywheel 34, which is attached to crown 12. Auxiliary flywheel 34 is connected by means of a belt (not shown) to the main flywheel (depicted generally at 38).

Figure 2:
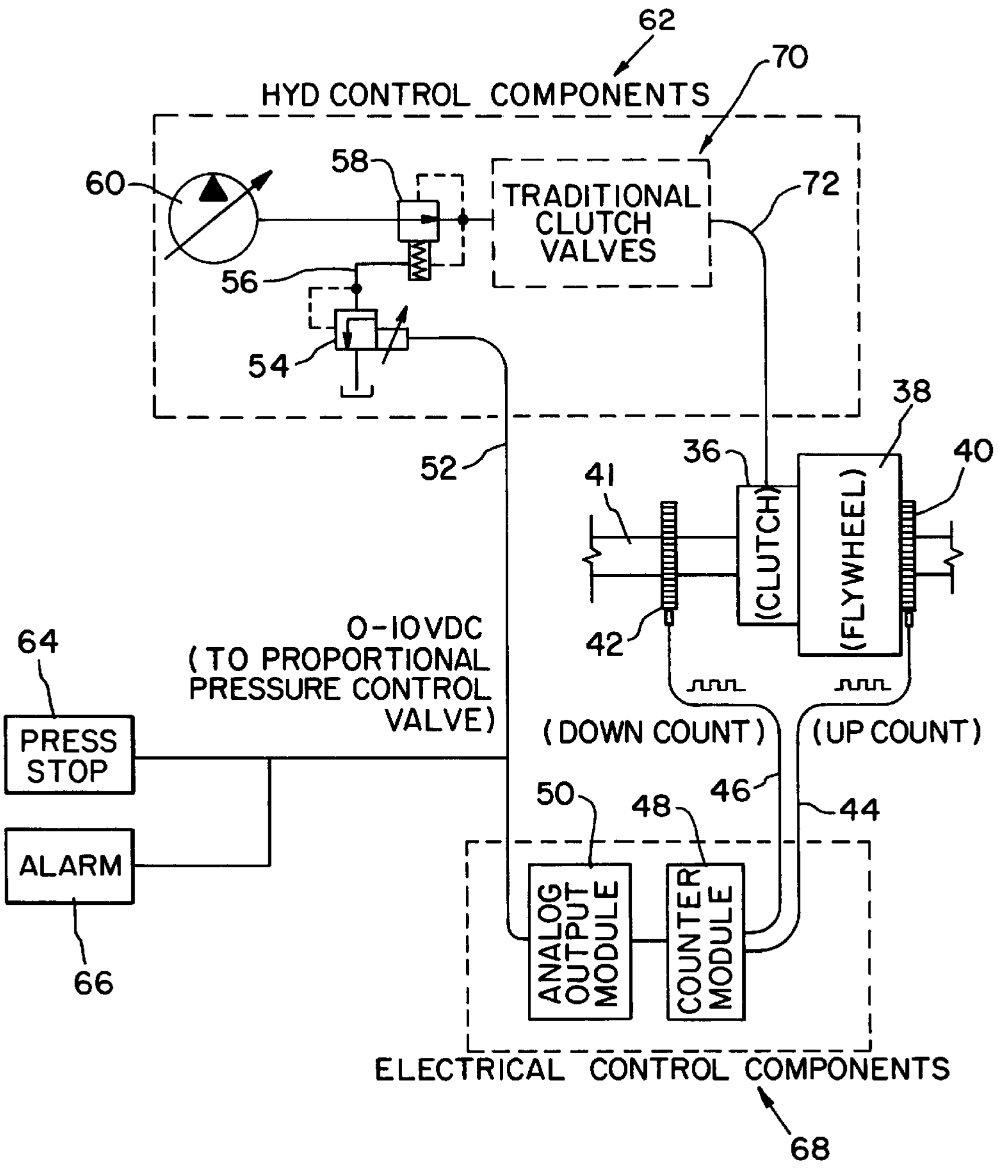
FIG. 2 is a schematic representation of an embodiment of the automatic clutch torque control of the current invention.

Generally, the present invention measures slippage of the clutch relative to the flywheel and adjusts the clutch engagement pressure of the clutch accordingly so as to establish a clutch torque which will produce the necessary and/or lowest tonnage for the particular press application being performed. FIG. 2 schematically depicts the automatic clutch torque control of the present invention. As illustrated, first pulse generator 40 is affixed to flywheel 38 and is communicatively connected to counter module 48 by means of first pulse communication line 44. Likewise, second pulse generator 42 is affixed to crankshaft 41 and is communicatively connected to counter module 48 by way of second pulse communication line 46. Analog output module 50 is operative to receive count information from counter module 48 and to communicate via pressure control communication line 52 to hydraulic control components 62.

Analog output module 50 is connected to proportional valve 54 via pressure control communication line 52. Proportional valve 54 is further connected to pressure reducing valve 58 via pilot pressure line 56. Pump 60 is operatively connected to pressure reducing valve 58 and is operative to produce hydraulic pressure to engage clutch 36 with flywheel 38. Pressure reducing valve 58 is connected via traditional clutch valves 70 and hydraulic communication line 72, as is known in the art, to clutch 36. Analog output module 50 is further communicatively connected to press stop circuit 64 and alarm 66.

In operation, first pulse generator 40 is formed from a sensor/gear or other well-known device for generating a pulse train representing the angular displacement of flywheel 38. The second pulse generator 42 is similarly formed and generates a pulse train representing the angular displacement of clutch 36 (clutch 36 is affixed to crankshaft 41). The pulse train produced by first pulse generator 40 and the pulse train generated by second pulse generator 42 are communicated to counter module 48.

Counter module 48 can be formed from any high speed counter module known in the art. Counter module 48 can be configured to count in several modes, and in one embodiment utilizes an up/down count mode. In this mode, pulses from first pulse generator 40 produce an up count in counter module 48 while pulses from second pulse generator 42 produce a down count in counter module 48. The electrical control components 68 of the current invention are preprogrammed with a predefined acceptable count range which is indicative of slippage. In this way, electrical control components 68 of the current system could be calibrated.

The electrical control components 68 are configured so that upon initial engagement of clutch 36, the analog signal from analog output module 50 would signal hydraulic control components 62 to deliver the full system clutch engagement pressure to clutch 36 for initial engagement of clutch 36 with flywheel 38. Upon initial clutch engagement and after the press achieves operating speed, electrical control components 68 work to achieve the optimum pressure setting to achieve the clutch torque necessary to produce the necessary operating tonnage of the press. In this "Find Optimum" routine, analog output module 50 would signal incremental decreases of the clutch engagement pressure of clutch 36 while monitoring counter module 48. Clutch engagement pressure would be continually incrementally decreased until counter module 48 signaled a clutch slippage condition. In one embodiment, the incremental decreases are 1% of the existing clutch engagement pressure.

Upon such a clutch slippage condition being achieved, analog output module 50 would signal a predefined incremental pressure increase (for example, clutch engagement pressure plus 1% from clutch slippage condition) in hydraulic control components 62 until counter module 48 was no longer sensing clutch slippage. After the necessary clutch torque or clutch engagement pressure was determined, the corresponding pressure value could be saved with tool storage information so that it would be unnecessary to run the "Find Optimum" routine again. Counter module 48 is operative to run a count sequence for every period of rotation.

Hydraulic control components 62 are operative to adjust the clutch engagement pressure of clutch 36. Pressure control communication line 52 carries a zero to ten VDC signal from analog output module 50 which signals hydraulic control components 62 to vary the clutch engagement pressure of clutch 36. Proportional pressure relief valve 54 receives this zero to ten VDC signal and is used to control a pilot pressure to pressure reducing valve 58. In this way, proportional valve 54 provides a varying hydraulic pressure proportional to the electric signal provided by analog output module 50. Pressure reducing valve 58 receives the pilot pressure from proportional pressure relief valve 54 and regulates the pressure delivered to clutch 36 via this pilot pressure.

After the system achieves the appropriate clutch torque and clutch engagement pressure, electrical control components 68 continue to monitor clutch slippage. In the event that electrical control components 68 sense clutch slippage, a signal could be sent to press stop circuit 64 and the press would cease operation. Additionally, a signal could be sent to alarm 66 to notify the press machine operator of an irregular clutch operational state.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for automatically controlling the clutch torque of a mechanical press having a clutch and a flywheel, said apparatus comprising:

a closed-loop dynamic feedback torque control mechanism operatively coupled to said clutch;

said closed-loop dynamic feedback torque control mechanism comprising:

a clutch slippage monitor, and a clutch pressure adjuster, said clutch pressure adjuster communicatively connected to said clutch slippage monitor.

2. The apparatus as recited in claim 1, wherein said clutch slippage monitor further includes a clutch-flywheel relative slippage monitor.

3. A mechanical press having an automatic clutch torque control, said press comprising:

a flywheel;

a clutch, said clutch selectively engaging said flywheel, said clutch having an adjustable clutch engagement pressure;

a clutch slip monitoring device for monitoring clutch slippage, and providing a monitoring signal indicative thereof, said clutch slip monitoring device operatively connected to said clutch; and a clutch pressure adjusting device, responsive to said monitoring signal, for varying said clutch engagement pressure to achieve a desired press running clutch torque condition, said clutch pressure adjusting device communicatively connected to said clutch slip monitoring device, said clutch pressure adjusting device operatively connected to said clutch.

4. The apparatus as recited in claim 3, wherein said clutch slip monitoring device comprises:

a first measuring device for monitoring the angular displacement of said flywheel;

a second measuring device for monitoring the angular displacement of said clutch; and a high speed counter module, said high speed counter module communicatively connected to said first measuring device and said second measuring device, said high speed counter module being operable to evaluate the angular displacement of said flywheel and said clutch to determine the extent of clutch slippage.

5. The apparatus as recited in claim 4, wherein said first measuring device comprises:

a first pulse generator, said first pulse generator affixed to said flywheel.

6. The apparatus as recited in claim 5, wherein said second measuring device comprises:

a second pulse generator, said second pulse generator connected to said clutch.

7. The apparatus as recited in claim 6, further comprising:

a crankshaft, said crankshaft operatively connected to said clutch, said second pulse generator affixed to said crankshaft.

8. The apparatus as recited in claim 7, wherein said first pulse generator and said second pulse generator are both resolvers.

9. The apparatus as recited in claim 8, further comprising:

an output module, said output module communicatively connected to said high speed counter module, said output module communicatively connected to said pressurizing device, whereby said output module is operative to control said adjustable clutch engagement pressure based upon clutch slippage as determined by said high speed counter module.

10. The apparatus as recited in claim 9, wherein said output module is a operative to provide a zero to ten VDC signal to said clutch pressure adjusting device.

11. The apparatus as recited in claim 10, wherein said clutch pressure adjusting device comprises:

a proportional pressure relief valve, said proportional pressure relief valve communicatively connected to said output module; and a pressure reducing valve, said pressure reducing valve being operative to control said adjustable clutch engagement pressure, said proportional pressure relief valve operatively connected to said pressure reducing valve, said proportional pressure relief valve being operative to communicate a pilot pressure to said pressure reducing valve, whereby said pilot pressure controls said adjustable clutch engagement pressure.

12. The press as recited in claim 3, wherein said clutch slip monitoring device further comprises:

a device to monitor relative slippage between said clutch and said flywheel.

13. The press as recited in claim 3, wherein said desired press running clutch torque condition corresponds to a clutch torque level minimally sufficient to produce a desired operating tonnage.

14. A method of operating a mechanical press having a clutch, comprising:

monitoring the operating tonnage in said mechanical press using information relating to clutch slippage and providing a monitoring signal representative thereof; and adjusting the press operating tonnage in real time to achieve a desired operating tonnage, in response to the monitoring signal.

15. A method of automatically controlling the clutch torque of a mechanical press to achieve the necessary operating tonnage for a press application, comprising:

monitoring clutch slippage during press operation; and adjusting the clutch torque to achieve the necessary operating tonnage and eliminate clutch slip.

16. The method of claim 15, wherein said step of monitoring clutch slippage during press operation comprises:

monitoring the angular displacement of the flywheel;

monitoring the angular displacement of the clutch; and evaluating the angular displacement of the flywheel and the angular displacement of the clutch to determine the extent of clutch slippage.

17. The method of claim 16, wherein said step of monitoring the angular displacement of the flywheel comprises:

affixing a pulse generator to the flywheel; and monitoring the pulses from said pulse generator.

18. The method of claim 17, wherein said step of monitoring the angular displacement of the clutch comprises:

connecting a pulse generator to the clutch; and monitoring the pulses from said pulse generator.

19. The method of claim 18, wherein said step of connecting a pulse generator to the clutch comprises:

affixing a pulse generator to the crankshaft.

20. The method of claim 19, wherein said step of evaluating the angular displacement of the flywheel and the angular displacement of the clutch to determine the extent of clutch slippage comprises:

providing a high speed counter module;

communicating the pulses from the flywheel pulse generator to said high speed counter module;

communicating the pulses from the clutch pulse generator to said counter module;

producing an up count in said counter module for every pulse from the flywheel pulse generator;

producing a down count in said counter module for every pulse from the clutch pulse generator; and determining the count total for each press stroke.

21. The method of claim 20, wherein said step of adjusting clutch torque to achieve the necessary operating tonnage and eliminate clutch slip comprises:

playing the clutch in full pressure engagement with the flywheel;

determining whether the count total is within a predefined acceptable range;

decreasing the clutch engagement pressure a predefined increment if the count total is within the predefined acceptable range;

repeating the two previous steps until the count total is no longer within the predefined acceptable range;

increasing the clutch engagement pressure a predefined increment; and maintaining a constant clutch engagement pressure.

22. The method of claim 21, further comprising:

halting the press if the count total is no longer within the predefined acceptable range.

23. The method of claim 21, further comprising:

signaling a press stop condition if the count total is no longer within the predefined acceptable range.

24. A method for use with a machine having a drive system including a clutch, said method comprising the steps of:

providing a measure of operating tonnage in said machine; and adjusting the clutch torque to a level minimally sufficient to produce a desired operating tonnage, in response to the operating tonnage measurement.

25. The method as recited in claim 24, wherein the clutch torque adjustment step comprises the steps of:

detecting the occurrence of a clutch slippage condition; and adjusting the clutch torque while the clutch slippage condition persists, until removal thereof.

26. The method as recited in claim 24, wherein the clutch torque adjustment step comprises the steps of:

adjusting the clutch torque until occurrence of a clutch slippage condition; and adjusting the clutch torque following occurrence of the clutch slippage condition until occurrence of a clutch engagement condition.

27. The method as recited in claim 26, wherein the step of adjusting the clutch torque until occurrence of the clutch slippage condition comprises the steps of:

decrementing a clutch engagement pressure.

28. The method as recited in claim 26, wherein the step of adjusting the clutch torque following occurrence of the clutch slippage condition comprises the steps of:

incrementing a clutch engagement pressure.

29. The method as recited in claim 24, wherein the clutch torque adjustment operation being performed dynamically during machine operation to achieve a desired machine running clutch torque condition.

30. The method as recited in claim 24, wherein the step of providing a measure of operating tonnage comprises the steps of:

monitoring clutch slippage.

* * * * *